United States Patent Office 3,059,993
Patented Oct. 23, 1962

3,059,993
HYDROGEN-ION-EXCHANGE OF ZEOLITES
Richard M. Barrer, Bromley, and David C. Sammon, Harwell, England, assignors to Union Carbide Corporation, a corporation of New York
No Drawing. Filed Sept. 12, 1960, Ser. No. 55,115
15 Claims. (Cl. 23—112)

This invention relates to a method for hydrogen ion-exchanging three dimensional crystalline zeolites, and more particularly to hydrogen ion-exchanging silver zeolites.

Hydrogen ion-exchanged zeolites may be employed as acidic catalysts in chemical reactions as acid ion-exchangers and as acidic adsorbents. For example, hydrogen ion-exchanged zeolite X (described and claimed in pending application Serial No. 400,389 now U.S. Patent 2,882,-244) has been found to adsorb ozone from an ozone-oxygen gas mixture at $-78°$ C. Weight loadings of 8–10 weight-percent ozone were obtained as compared to 7 weight-percent adsorbable on silica gel under the same conditions. At this low temperature the adsorbed ozone was only very slowly decomposed. However, at higher temperatures such as $0°$ C., the zeolite effects a rapid decomposition of the ozone. This is a further advantage in that when the hydrogen ion-exchanged zeolite is used to store ozone, any inadvertent temperature rise, instead of causing release of dangerously reactive ozone, evolves normal oxygen gas.

Various methods are presently available for hydrogen ion-exchanging crystalline zeolites. Leaching the zeolites with water gives a slight amount of hydrogen ion-exchange. However, more thorough hydrogen ion-exchange can be achieved by treating the zeolite with an aqueous acid solution. Solutions of higher acidity tend to provide greater hydrogen exchange but also tend to destroy the zeolitic crystal structure. An alternative method for providing hydrogen-exchanged zeolite is to ammonium ion-exchange the zeolite and decompose the ammonium ions and drive off volatile ammonia, thereby leaving a hydrogen-exchanged zeolite. Again, however, the crystal structure is at least partially destroyed.

It is an object of this invention to provide a method for hydrogen ion-exchanging crystalline zeolites wherein the crystal structure is retained by the exchanged product. Other objects will be apparent from the disclosure.

Zeolites are hydrated aluminosilicates having the general formula expressed in terms of oxides as follows:

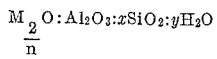

wherein "M" represents at least one metal, and "$n$" its valence.

Zeolites consist basically of three-dimensional frameworks of $SiO_4$ and $AlO_4$ tetrahedron. The terahedra are cross-linked by the sharing of oxygen atoms so that the ratio of oxygen atoms to the total of the aluminum and silicon atoms is equal to two. The electrovalence of the tetrahedra containing aluminum is balanced by the inclusion in the crystal of a cation. One cation may be exchanged for another by ion-exchange techniques. The spaces between the tetrahedra are occupied by water molecules prior to dehydration.

Not all cations will cation-exchange with the zeolites. Some cations are too large to enter the zeolitic crystal framework. That is, the maximum dimension of the minimum projected cross-section of the cation is large enough to hinder entrance of that cation into the pores of the zeolite. Other cations possess too little energy to enter the structure; some cations already present in the structure tend to repel the entering cations.

It may be seen that competition exists between cations for the zeolitic exchange sites on the basis of cation size and energy. A small cation wtih a high energy level is more likely to gain an exchange site than a cation of such size that it will just fit into the framework, having only the minimum energy for exchange. Obviously, cation concentration is also a factor that affects the probability of ion exchange. Thus, an aqueous solution of potassium chloride provides almost exclusive exchange of potassium ion for sodium ion when in contact with a sodium zeolite; the small amount of hydrogen ion present by dissociation of water cannot successfully compete with the potassium and sodium ions for the exchange sites.

By the method of this invention, hydrogen ions are made to exchange successfully by contacting a zeolite containing silver cations with an aqueous solution containing (1) hydrogen ions in a concentration not substantially greater than the hydrogen ion concentration of water, (2) anions which form precipitates with the silver cations and (3) only cations which permit hydrogen ions in the aqueous solution to compete successfully for at least a part of the exchange sites in the zeolitic crystal framework. Hydrogen ions are thereby exchanged in the solution for at least a part of the silver cations, and the latter are precipitated.

Cations that permit substantial successful competition by hydrogen ion are cations which, because of their size, energy, or concentration, or combination of these factors, exchange with the exchangeable cations of the zeolite only with difficulty, so that they do not effectively bar exchange with hydrogen ions.

The method of this invention will be more clearly understood by the following examples.

Silver analcite was prepared by grinding the natural zeolite, analcite, with about ten times its weight of silver nitrate, and heating the mixture at about $220°$ C. to $230°$ C. in an open beaker in an electrically heated furnace for about four hours. This process was repeated, and the resultant mixture was cooled to room temperature, immersed in water to dissolve the impurities, filtered, washed and air-dried.

Part of this silver analcite was treated with a solution of tetraethyl ammonium iodide; tests indicated that about 60 percent of the silver ion had been replaced by hydrogen ion, and that substantially no teraethyl ammonium ion was exchanged. The exchange proceeded according to the equation:

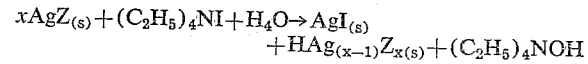

wherein "Z" represents analcite. The extent of hydrogen exchange was promoted by the low solubility of silver iodide.

The remainder of the silver analcite was treated with a solution of cesium chloride (47.5 mg. CsCl to 10 ml. $H_2O$) so that the molar ratio of silver analcite to cesium chloride was 0.76. The mixture was heated over a water bath for 18 hours, and the precipitated silver chloride removed by filtering the reaction mixture and leaching the residue with cold, concentrated ammonium hydroxide. This procedure was repeated four times with fresh aqueous cesium chloride. The analcite was rinsed, dried and chemically analyzed. About 6.1 percent hydrogen-exchange had occurred. The equation for the exchange is:

A synthetic zeolite, sodium zeolite A (described and claimed in pending application Serial No. 400,388, now U.S. Patent 2,822,243), was silver ion-exchanged as follows: 35 grams of sodium zeolite A were treated with a solution consisting of 34 grams of silver nitrate, 0.85 gram of sodium nitrate in 200 milliliters of water at room temperature for 30 minutes. The zeolite was then filtered and treated again with fresh hot silver nitrate solution for five minutes. The product was filtered, washed with water and dried. A five gram portion of this zeolite was treated with a solution of 10.96 grams of tetramethyl ammonium chloride in 100 milliliters of water. The solids were filtered, washed with concentrated ammonium hydroxide and analyzed. Analysis indicated about 63 mole percent hydrogen exchange of the zeolite.

In the examples just cited, there was little, if any, entry by the cation of the treating solution into the zeolite crystal structure. However, it is not necessary to prohibit exchange by these cations, but only to hinder it in such a manner that hydrogen ions may successfully compete for the exchange sites. That substantial hydrogen ion-exchange is possible under such conditions is evidenced by the following example.

The silver-exchanged form of sodium zeolite X (described and claimed in pending application Serial No. 400,389, now U.S. Patent 2,882,244) was prepared by treating 40 grams of sodium zeolite X with a silver nitrate solution (34 grams of silver nitrate and 0.85 gram of sodium nitrate in 200 milliliters of water) at room temperature for 30 minutes. The material was filtered and the treatment repeated. The zeolite was filtered, washed with water and dried.

A five gram portion of the silver zeolite X was treated with a solution comprising 10.96 grams of tetramethyl ammonium chloride in 100 milliliters of water. The solids were filtered, washed with concentrated ammonium hydroxide, dried and analyzed. About 63 mole percent hydrogen exchange and about 6 mole percent tetramethyl ammonium cation exchange took place.

As a further illustrations of the present invention, hydrogen ion exchanged zeolites were prepared from the following materials: erionite, sodium-potassium zeolite T, sodium zeolite Y and potassium zeolite L.

Zeolite Y is described and claimed in U.S. patent application Serial Nos. 728,057, now abandoned, and 862,062, filed respectively on April 14, 1958, and December 28, 1959.

Zeolite L is described and claimed in U.S. patent application Serial No. 711,565, now abandoned, filed January 28, 1958.

Zeolite T is described and claimed in U.S. patent application Serial No. 733,819, filed May 8, 1958, now U.S. Patent 2,950,952.

Samples of these materials were first sieved by passage through a 40 mesh screen. Next seven gram portions of each were slurried with 300 cubic centimeter portions of a 1-molar aqueous solution of silver nitrate, and the mixture was agitated by means of a magnetic stirrer for a period of two hours. The products were filtered and washed with distilled water. The samples were then reslurried with 300 cubic centimeter portions of a 1-molar aqueous solution of silver nitrate and stirred with the same magnetic stirrer for another two-hour period. The products were again filtered and 150 cc. portions of the 1-molar silver nitrate solution were passed over the filter cake of each sample. The sample were next washed free of nitrate ions with distilled water and placed in a dark location overnight for drying. The pH of the samples was 6-7.

The previously described silver exchanged zeolites were next hydrogen exchanged in the following manner: Five grams of each sample except the silver exchanged erionite was separately treated with a solution of 10.96 grams of tetramethyl ammonium chloride dissolved in 100 cubic centimeters of distilled water. Five grams of the erionite sample were treated with a solution of 10.96 grams of tetramethyl ammonium bromide dissolved in 100 cubic centimeters of water. The resulting slurries were allowed to set until a constant pH value was obtained. The final pH of all samples was 8-9 except zeolite L which was 10 as determined by pH paper. The hydrogen exchanged samples were next filtered, washed with water, and washed with concentrated ammonium hydroxide until no silver ions could be detected. The samples were again washed with 700 cubic centimeters of distilled water, and the pH after such washing was still found to be 9. The hydrogen exchanged zeolite samples were then dried overnight at room temperature in a dark atmosphere, and analyzed for percent Ag. The mole percent hydrogen exchange was then calculated with the following results:

| Material | Mole percent H exchg. | Mole percent Ag left |
|---|---|---|
| Erionite | 20.0 | 35.0 |
| Sodium zeolite Y | 35.8 | 28.2 |
| Potassium zeolite L | 44.0 | 16.5 |
| Sodium-potassium zeolite T | 28.0 | 39 |

Although preferred embodiments of the invention have been described in detail, it is contemplated that modifications of the method may be made and that some features may be employed without others, all within the spirit and scope of the invention.

This is a continuation-in-part application of copending application Serial No. 578,597, filed April 17, 1956, in the name of R. M. Barrer and D. C. Sammon, now abandoned.

What is claimed is:

1. A method for hydrogen ion-exchanging a three-dimensional crystalline zeolite containing silver cations comprising bringing said crystalline zeolite into intimate contact with an aqueous solution containing (1) hydrogen ions in a concentration not substantially greater than the hydrogen ion concentration of water, (2) anions which form precipitates with said silver cations of said crystalline zeolite and (3) only cations which permit hydrogen ions in said aqueous solution to compete successfully for at least a part of the exchange sites in said crystalline zeolite, exchanging hydrogen ions in said solution for at least a part of said silver cations, and precipitating at least a part of said silver cations in said zeolite.

2. A method for hydrogen ion-exchanging a three-dimensional crystalline zeolite containing silver cations comprising bringing said crystalline zeolite into intimate contact with an aqueous solution containing (1) hydrogen ions in a concentration not substantially greater than the hydrogen ion concentration of water, (2) anions which form precipitates with said silver cations of said crystalline zeolite and (3) only cations which enter said three-dimensional crystalline zeolite less easily than hydrogen ions in said aqueous solution, exchanging hydrogen ions in said solution for at least a part of said silver cations, and precipitating at least a part of said silver cations in said zeolite.

3. A method for hydrogen ion-exchanging a three-dimensional crystalline zeolite containing silver cations comprising bringing said crystalline zeolite into intimate contact with an aqueous solution containing (1) hydrogen ions in a concentration not substantially greater than the hydrogen ion concentration of water, (2) anions which form precipitates with said silver cations of said crystalline zeolite and (3) only cations which have maximum dimensions of the minimum projected cross-sections large enough to hinder entrance of said cation into the pores of said crystalline zeolite, exchanging hydrogen ions in said solution for at least a part of said silver cations, and precipitating at least a part of said silver cations in said zeolite.

4. A method for hydrogen ion-exchanging a three-dimensional crystalline zeolite containing silver cations comprising bringing said crystalline zeolite into intimate contact with an aqueous solution containing (1) hydrogen ions in a concentration not substantially greater than the hydrogen ion concentration of water, (2) anions which form precipitates with said silver cations of said crystalline zeolite and (3) only cations which have insufficient energy of activation for entry of said cations into said crystalline zeolite, exchanging hydrogen ions in said solution for at least a part of said silver cations, and precipitating at least a part of said silver cations in said zeolite.

5. A method for hydrogen ion-exchanging silver analcite comprising bringing into intimate contact with said silver analcite an aqueous solution containing (1) hydrogen ions in a concentration not substantially greater than the hydrogen ion concentration of water, (2) halide ions and (3) at least one cation selected from the group consisting of tetraethyl ammonium ion and cesium ion, ex-exchanging hydrogen ions in said solution for at least part of the silver in said silver analcite, and precipitating at least part of the silver in said silver analcite as silver halide.

6. A method for hydrogen ion-exchanging silver zeolite A comprising bringing into intimate contact with said silver zeolite A an aqueous solution containing tetramethyl ammonium halide and hydrogen ions in a concentration not substantially greater than the hydrogen ion concentration of water, exchanging hydrogen ions in said solution for at least a part of the silver in said silver zeolite A, and precipitating at least part of the silver in said silver zeolite A as silver halide.

7. A method for hydrogen ion-exchanging silver zeolite X comprising bringing into intimate contact with said silver zeolite X an aqueous solution containing tetramethyl ammonium halide and hydrogen ions in a concentration not substantially greater than the hydrogen ion concentration of water, exchanging hydrogen ions in said solution for at least a part of the silver in said silver zeolite X, and precipitating at least part of the silver in said silver zeolite X as silver halide.

8. A method for hydrogen ion-exchanging silver erionite comprising bringing said silver erionite into intimate contact with an aqueous solution containing (1) hydrogen ions in a concentration not substantially greater than the hydrogen ion concentration of water, (2) anions which form precipitates with the silver cations of said silver erionite and (3) only cations which permit hydrogen ions in said aqueous solution to compete successfully for at least a part of the exchange sites in said silver erionite, exchanging hydrogen ions in said solution for at least a part of said silver cations, and precipitating at least a part of said silver cations.

9. A method for hydrogen ion-exchanging silver zeolite Y comprising bringing said silver zeolite Y into intimate contact with an aqueous solution containing (1) hydrogen ions in a concentration not substantially greater than the hydrogen ion concentration of water, (2) anions which form precipitates with the silver cations of said silver zeolite Y and (3) only cations which permit hydrogen ions in said aqueous solution to compete successfully for at least a part of the exchange sites in said silver zeolite Y, exchanging hydrogen ions in said solution for at least a part of said silver cations, and precipitating at least a part of said silver cations.

10. A method for hydrogen ion-exchanging silver zeolite L comprising bringing said silver zeolite L into intimate contact with an aqueous solution containing (1) hydrogen ions in a concentration not substantially greater than the hydrogen ion concentration of water, (2) anions which form precipitates with the silver cations of said silver zeolite L and (3) only cations which permit hydrogen ions in said aqueous solution to compete successfully for at least a part of the exchange sites in said silver zeolite L, exchanging hydrogen ions in said solution for at least a part of said silver cations, and precipitating at least a part of said silver cations.

11. A method for hydrogen ion-exchanging silver zeolite T comprising bringing said silver zeolite T into intimate contact with an aqueous solution containing (1) hydrogen ions in a concentration not substantially greater than the hydrogen ion concentration of water, (2) anions which form precipitates with the silver cations of said silver zeolite T and (3) only cations which permit hydrogen ions in said aqueous solution to compete successfully for at least a part of the exchange sites in said silver zeolite T, exchanging hydrogen ions in said solution for at least a part of said silver cations, and precipitating at least a part of said silver cations.

12. A method for hydrogen ion-exchanging silver erionite comprising bringing into intimate contact with said silver erionite an aqueous solution containing tetramethyl ammonium halide, and hydrogen ions in a concentration not substantially greater than the hydrogen ion concentration of water, exchanging hydrogen ions in said solution for at least part of the silver in said silver erionite, and precipitating at least part of the silver in said silver erionite as silver halide.

13. A method for hydrogen ion-exchanging silver zeolite Y comprising bringing into intimate contact with said silver zeolite Y an aqueous solution containing tetramethyl ammonium halide, and hydrogen ions in a concentration not substantially greater than the hydrogen ion concentration of water, exchanging hydrogen ions in said solution for at least part of the silver in said silver zeolite Y, and precipitating at least part of the silver in said silver zeolite Y as silver halide.

14. A method for hydrogen ion-exchanging silver zeolite L comprising bringing into intimate contact with said silver zeolite L an aqueous solution containing tetramethyl ammonium halide, and hydrogen ions in a concentration not substantially greater than the hydrogen ion concentration of water, exchanging hydrogen ions in said solution for at least part of the silver in said silver zeolite L, and precipitating at least part of the silver in said silver zeolite L as silver halide.

15. A method for hydrogen ion-exchanging silver zeolite T comprising bringing into intimate contact with said silver zeolite T an aqueous solution containing tetramethyl ammonium halide, and hydrogen ions in a concentration not substantially greater than the hydrogen ion concentration of water, exchanging hydrogen ions in said solution for at least part of the silver in said silver zeolite T, and precipitating at least part of the silver in said silver zeolite T as silver halide.

References Cited in the file of this patent

UNITED STATES PATENTS

| | | |
|---|---|---|
| 2,326,323 | Benedict | Aug. 10, 1943 |
| 2,413,134 | Barrer | Dec. 24, 1946 |
| 2,678,885 | Porter | May 18, 1954 |

OTHER REFERENCES

Hendricks: "Ind. and Eng., Chem.," 37 625–630 (1945).